United States Patent [19]

Deaner et al.

[11] Patent Number: 5,539,027
[45] Date of Patent: * Jul. 23, 1996

[54] ADVANCED POLYMER/WOOD COMPOSITE STRUCTURAL MEMBER

[75] Inventors: Michael J. Deaner, Osceola, Wis.; Guiseppe Puppin, Bayport, Minn.; Kurt E. Heikkila, Circle Pines, Minn.

[73] Assignee: Andersen Corporation, Bayport, Minn.

[ * ] Notice: The portion of the term of this patent subsequent to Apr. 7, 2014, has been disclaimed.

[21] Appl. No.: 326,472

[22] Filed: Oct. 20, 1994

Related U.S. Application Data

[63] Continuation of Ser. No. 224,399, Apr. 7, 1994, abandoned, which is a continuation of Ser. No. 938,365, Aug. 31, 1992, abandoned.

[51] Int. Cl.$^6$ .............................. C08L 97/02; C08J 5/04; E04C 1/00; B32B 5/00
[52] U.S. Cl. .............................. 524/13; 524/16; 428/338; 428/339; 52/309.1; 52/309.7
[58] Field of Search ............................ 524/13, 16; 428/338, 428/339; 52/309.1, 309.7

[56] References Cited

U.S. PATENT DOCUMENTS

| | | | |
|---|---|---|---|
| 2,188,396 | 1/1940 | Semon | 18/55 |
| 2,489,373 | 11/1945 | Gilman | 260/37 |
| 2,519,442 | 8/1950 | Delorme et al. | 260/17.4 |
| 2,558,378 | 6/1951 | Petry | 260/41 |
| 2,635,976 | 4/1953 | Meiler et al. | 154/132 |
| 2,680,102 | 6/1954 | Becher | 260/17.3 |
| 2,789,903 | 4/1957 | Lukman et al. | 92/21 |
| 2,926,729 | 3/1960 | Zanini | 160/236 |
| 2,935,763 | 5/1960 | Newman et al. | 18/55 |
| 3,287,480 | 11/1966 | Wechsler et al. | 264/122 |
| 3,308,218 | 3/1967 | Wiegand et al. | 264/121 |
| 3,309,444 | 3/1967 | Schueler | 264/109 |
| 3,349,538 | 10/1967 | Crossman | 52/731 |
| 3,432,885 | 3/1969 | Zanini | 18/13 |
| 3,492,388 | 1/1970 | Inglin-Knosel | 264/129 |
| 3,493,527 | 2/1970 | Schueler | 260/17.2 |
| 3,562,373 | 2/1971 | Logrippo | 264/118 |
| 3,645,939 | 2/1972 | Gaylord | 260/17.4 |
| 3,671,615 | 6/1972 | Price | 264/39 |
| 3,833,325 | 9/1974 | Ramsey | 425/113 |
| 3,878,143 | 4/1975 | Baumann et al. | 260/17.4 |
| 3,888,810 | 6/1975 | shinomura | 260/17.4 |
| 3,899,559 | 8/1975 | Johnanson et al. | 264/115 |
| 3,904,726 | 9/1975 | Jacquelin et al. | 264/117 |
| 3,931,384 | 1/1976 | Forquer et al. | 264/120 |
| 3,943,079 | 3/1976 | Hamed | 260/17.4 |
| 3,956,541 | 5/1976 | Pringle | 428/2 |
| 3,956,555 | 5/1976 | McKean | 428/106 |
| 3,969,459 | 7/1976 | Fremont et al. | 264/109 |
| 4,005,162 | 1/1977 | Bucking | 264/25 |
| 4,012,348 | 3/1977 | Chelland et al. | 260/28.5 |
| 4,016,232 | 4/1977 | Pringle | 264/112 |
| 4,018,722 | 4/1977 | Baker | 260/2.3 |
| 4,033,913 | 7/1977 | Sunden | 260/17 |
| 4,045,603 | 8/1977 | Smith | 428/2 |
| 4,056,591 | 11/1977 | Goettler et al. | 264/108 |
| 4,058,580 | 11/1977 | Flanders | 264/113 |
| 4,071,479 | 1/1978 | Broyde et al. | 260/2.3 |
| 4,097,648 | 6/1978 | Pringle | 428/326 |
| 4,102,106 | 7/1978 | Golder et al. | 52/533 |
| 4,115,497 | 9/1978 | Halmo | 264/115 |
| 4,145,389 | 3/1979 | Smith | 264/40.7 |
| 4,168,251 | 9/1979 | Schinzel et al. | 260/17.4 |
| 4,181,764 | 1/1980 | Totten | 428/155 |
| 4,187,352 | 2/1980 | Klobbie | 521/79 |
| 4,203,876 | 5/1980 | Dereppe et al. | 260/17.4 |
| 4,228,116 | 10/1980 | Colombo et al. | 264/119 |
| 4,239,679 | 12/1980 | Rolls et al. | 260/42.49 |
| 4,244,903 | 1/1981 | Schnause | 264/68 |
| 4,248,743 | 2/1981 | Goettler | 260/17.4 |
| 4,248,820 | 2/1981 | Haataja | 264/113 |
| 4,250,222 | 2/1981 | Mavel et al. | 428/285 |
| 4,263,184 | 4/1981 | Leo et al. | 260/17.4 |
| 4,273,688 | 6/1981 | Porzel et al. | 260/17.4 |
| 4,277,428 | 7/1981 | Luck et al. | 264/118 |
| 4,281,039 | 7/1981 | Miura et al. | 428/159 |
| 4,290,988 | 9/1981 | Nopper et al. | 264/112 |
| 4,305,901 | 12/1981 | Prince et al. | 264/176 |
| 4,311,554 | 1/1982 | Herr | 162/159 |
| 4,311,621 | 1/1982 | Nishizawa et al. | 260/17.2 |
| 4,328,136 | 5/1982 | Blount | 523/204 |
| 4,376,144 | 3/1983 | Goettler | 428/36 |
| 4,382,108 | 5/1983 | Carroll et al. | 428/326 |
| 4,393,020 | 7/1983 | Li et al. | 264/108 |
| 4,414,267 | 11/1983 | Coran et al. | 428/288 |

| | | | |
|---|---|---|---|
| 4,420,351 | 12/1983 | Lussi et al. | 156/62.4 |
| 4,426,470 | 1/1984 | Wessling et al. | 524/35 |
| 4,440,708 | 4/1984 | Haataja et al. | 264/109 |
| 4,454,091 | 6/1984 | Chion et al. | 264/171 |
| 4,455,709 | 6/1984 | Zaniini | 16/90 |
| 4,481,701 | 11/1984 | Hewitt | 29/416 |
| 4,491,553 | 1/1985 | Yamada et al. | 264/51 |
| 4,503,115 | 3/1985 | Hemels et al. | 428/281 |
| 4,505,869 | 3/1985 | Nishibori | 264/115 |
| 4,506,037 | 3/1985 | Suzuki et al. | 521/82 |
| 4,508,595 | 4/1985 | Gasland | 162/158 |
| 4,551,294 | 11/1985 | Wottka et al. | 264/175 |
| 4,562,218 | 12/1985 | Fornadel et al. | 524/15 |
| 4,594,372 | 6/1986 | Natov et al. | 523/208 |
| 4,597,928 | 7/1986 | Terentiev et al. | 264/87 |
| 4,610,900 | 9/1986 | Nishibori | 428/15 |
| 4,645,631 | 2/1987 | Hegenstaller et al. | 264/69 |
| 4,659,754 | 4/1987 | Edwards et al. | 523/214 |
| 4,663,225 | 5/1987 | Farley et al. | 428/290 |
| 4,686,251 | 8/1987 | Ostermann et al. | 523/448 |
| 4,687,793 | 8/1987 | Motegi et al. | 523/200 |
| 4,716,062 | 12/1987 | Klein | 428/36 |
| 4,734,236 | 3/1988 | Davis | 264/112 |
| 4,737,532 | 4/1988 | Fujita et al. | 524/13 |
| 4,769,109 | 9/1988 | Tellvik et al. | 162/123 |
| 4,769,274 | 9/1988 | Tellvik et al. | 428/218 |
| 4,774,272 | 9/1988 | Lamphere et al. | 524/13 |
| 4,790,966 | 12/1988 | Sandberg et al. | 264/39 |
| 4,818,604 | 4/1989 | Tock | 428/319.9 |
| 4,820,763 | 4/1989 | Yang | 524/505 |
| 4,837,977 | 6/1989 | Mauro | 49/501 |
| 4,851,458 | 7/1989 | Hopperdietzel | 523/205 |
| 4,865,788 | 9/1989 | Davis | 264/112 |
| 4,889,673 | 12/1989 | Takimoto | 264/118 |
| 4,894,192 | 1/1990 | Warych | 264/68 |
| 4,915,764 | 4/1990 | Miani | 156/244.19 |
| 4,927,579 | 5/1990 | Moore | 264/101 |
| 4,929,409 | 5/1990 | Agren et al. | 264/508 |
| 4,935,182 | 6/1990 | Ehner et al. | 264/112 |
| 4,957,809 | 9/1990 | Davis | 428/283 |
| 4,960,548 | 10/1990 | Ikeda et al. | 264/40.4 |
| 4,968,463 | 11/1990 | Levasseur | 264/40.1 |
| 4,973,440 | 11/1990 | Tamura et al. | 264/114 |
| 4,978,489 | 12/1990 | Radvan et al. | 264/118 |
| 4,978,575 | 12/1990 | Ziess | 428/402 |
| 4,988,478 | 1/1991 | Held | 264/518 |
| 5,002,713 | 3/1991 | Palardy et al. | 264/109 |
| 5,008,310 | 4/1991 | Beshay | 524/13 |
| 5,009,586 | 4/1991 | Pallmann | 425/311 |
| 5,020,915 | 6/1991 | Julien | 366/89 |
| 5,021,490 | 6/1991 | Vyvoda et al. | 524/140 |
| 5,049,334 | 9/1991 | Bach | 264/122 |
| 5,057,167 | 10/1991 | Gersbeck | 156/62.2 |
| 5,075,057 | 12/1991 | Hoedl | 264/115 |
| 5,075,359 | 12/1991 | Castagna et al. | 524/13 |
| 5,078,937 | 1/1992 | Eela | 264/109 |
| 5,082,605 | 1/1992 | Brooks et al. | 264/40.6 |
| 5,084,135 | 1/1992 | Brooks et al. | 162/4 |
| 5,087,400 | 2/1992 | Theuveny | 264/115 |
| 5,088,910 | 2/1992 | Goforth et al. | 425/142 |
| 5,093,058 | 3/1992 | Harmon et al. | 264/115 |
| 5,096,046 | 3/1992 | Goforth et al. | 198/604 |
| 5,096,406 | 3/1992 | Brooks et al. | 425/205 |

FOREIGN PATENT DOCUMENTS

| | | |
|---|---|---|
| 2200112 | 4/1974 | France . |
| 2270311 | 12/1975 | France . |
| 2344101 | 1/1977 | France . |
| 2564374 | 11/1985 | France . |
| 2042176 | 4/1971 | Germany . |
| 2104903 | 3/1983 | United Kingdom . |
| 2171953 | 9/1986 | United Kingdom . |
| 2186655 | 9/1987 | United Kingdom . |
| WO90/08020 | 7/1990 | WIPO . |

OTHER PUBLICATIONS

Kokta et al., "Use of Wood Fibers in Thermoplastic Composites", Polymer Composites, Oct. 1983, vol. 4, No. 4, pp. 229–232.

Yam et al., "Composites From Compounding Wood Fibers With Recycled High Density Polyethylene", Polymer Engineering and Science, Mid–Jun. 1990, vol. 30, No. 11, pp. 693–699.

Zadorecki et al., "Future Prospects for Wood Cellulose as Reinforcement in Organic Polymer Composites", Polymer Composites, Apr. 1989, vol. 10, No. 2, pp. 69–77.

Woodhams et al., "Wood Fibers as Reinforcing Fillers for Polyolefins", Polymer Engineering and Science, Oct. 1984, vol. 24, No. 15, pp. 1166–1171.

"Mechanical Properties of Wood", Revision by Bendtsen et al., pp. 4–2 through 4–44.

Maldas et al., "Composites of Polyvinyl Chloride—Wood Fibers: IV. Effect of the Nature of Fibers", Journal of Vinyl Technology, June 1989, vol. 11, No. 2, pp. 90–98.

Raj et al., "Use of Wood Fibers as Filler in Common Thermoplastic Studies on Mechanical Properties", Science and Engineering of Composite Materials, vol. 1, No. 3, 1989, pp. 85–98.

Kokta et al., "Use of Grafted Wood Fibers in Thermoplastic Composites V. Polystyrene", pp. 90–96.

Klason et al., "The Efficiency of Cellulosic Fillers in Common Thermoplastics. Part I. Filling Without Processing Aids or Coupling Agents", International Journal of Polymeric Materials, Mar. 1984, pp. 159–187.

Dalvag et al., "The Efficiency of Cellulosic Fillers in Common Thermoplastics. Part II. Filling with Process Aids and Coupling Agents", International Journal of Polymeric Materials, 1985, vol. 11, pp. 9–38.

Rogalski et al., "Poly(Vinyl–Chloride) Wood Fiber Composites", Antec '87, pp. 1436–1441.

Raj et al., "Use of Wood Fibers in Thermoplastics. VII. The Effect of Coupling Agents in Polyethylene–Wood Fiber Composites", Journal of Applies Polymer Science, vol. 37, (1989), pp. 1089–1103.

Kokta et al., "Composites of Polyvinyl Chloride–Wood Fibers. I. Effect of Isocyanate as a Bonding Agent", Polym. Plast. Technol. Eng. 29(1&2), 1990, pp. 87–118.

Kokta et al., "Composites of Polyvinyl Chloride–Wood Fibers. III. Effect of Silane as Coupling Agent", Journal of Vinyl Technology, Sep. 1990, vol. 12, No. 3, pp. 146–153.

Kokta et al., "Composites of Poly(Vinyl Chloride) and Wood Fibers. Part II: Effect of Chemical Treatment", Polymer Composites, Apr. 1990, vol. 11, No. 2, pp. 84–89.

B F Goodrich, Geon Vinyl Division, Section One, FIBER-LOC®, Polymer Composites, Engineering Design Data Sheet, pp. 2–15.

"A Complete Guide to Andersen Windows & Patio Doors", 1992 Product Catalog.

A.E.R.T. (Advanced Environmental Recycling Technologies, Inc.) Technical Brochure.

DATABASE WPI, Week 8442, Derwent Publications Ltd., London, GB; AN 84–259377 & JP–A–59 156 172 (Ain Eng.), 6 Sep. 1984

European Search Report dated Nov. 10, 1993.

DATABASE WPI, Week 8402, Derwent Publications Ltd., London, GB; AN 84–008707 & JP–A–58 204 049 (Ein Eng.), 28 Nov. 1983.

DATABASE WPI, Week 84721 Derwent Publications Ltd., London, GB; AN 87-147663 & JP-A-61 086 042 (Chisso), 20 Apr. 1987.

DATABASE WPI, Week 8652, Derwent Publications Ltd., London, GB; AN 86-341745 & JP-A-61 236 858 (Chisso), 22 Oct. 1986.

*Primary Examiner*—Paul R. Michl
*Assistant Examiner*—LaVonda R. DeWitt
*Attorney, Agent, or Firm*—Merchant, Gould, Smith, Edell, Welter & Schmidt

[57] ABSTRACT

A polymer and wood composite structural members can be manufactured by extruding and injection molding a composition comprising polyvinyl chloride, wood fiber and optionally a concentration of an intentionally added waste stream. Such structural members have strength, workability, fastener retention, resistance to rot and insect attack, and thermal properties sufficient to constitute an advanced composite wood replacement material. The advanced structural member can be used as a component in construction of any structure requiring sized lumber or specifically shaped wood products. In such an application, the structural members can be extruded in the shape of commonly available lumber. The structural members of the invention can also be extruded in complex shapes adapted to the assembly of windows and doors used in both residential and commercial structures. The structural members have a modulus, a coefficient of thermal expansion, a coefficient of elasticity, a compressive strength and other related properties ideal for use as a replacement for either metal or wood, window or door structural components. The preferred structural member is manufactured from a polyvinyl chloride and wood fiber composite that optionally contains an intentionally recycled impurity component. Such components comprise waste materials common in the manufacture of wood doors and windows. We have found that the cooperation between the amount of polymer material, the amount of an oriented wood fiber, and control over water content results in the improved structural properties of the composite structural members of the invention.

16 Claims, 2 Drawing Sheets

ADVANCED POLYMER/WOOD COMPOSITE STRUCTURAL MEMBER

This is a continuation of application Ser. No. 08/224,399, filed Apr. 7, 1994, now abandoned, which is a File Wrapper Continuation of Ser. No. 07/938,365, filed Aug. 31, 1992, now abandoned, which applications are incorporated herein by reference.

FIELD OF THE INVENTION

The invention relates to materials used for the fabrication of structural members used in residential and commercial architecture and preferably in the manufacture of windows and doors. More particularly, the invention relates to an improved structural member that can be used as a direct replacement for wood and metal components and having superior properties. The structural members of the invention can comprise sized lumber replacements and structural components with complex functional shapes such as wood and door rails, jambs, stiles, sills, tracks, stop sash and trim elements such as grid cove, bead, quarter round, etc.

BACKGROUND OF THE INVENTION

Conventional window and door manufacture utilize structural members made commonly from hard and soft wood members and metal components, typically aluminum. Residential windows and doors are often manufactured from a number of specially shaped milled wood products that are assembled with glass sheets to form typically double hung or casement windows and sliding or hinged door units. Wood windows and doors while structurally sound and well adapted for use in many residential installations, require painting and other routine maintenance and can have problems under certain circumstances Caused by the insect attack and by other deterioration of wood components. Wooden windows also suffer from cost problems related to the availability of suitable wood for construction. Clear wood and related wood products are slowly becoming scarce and costs increase rapidly as demand increases.

Metal windows and doors have been introduced into the marketplace. Such metal windows and doors are often made from extruded aluminum parts that when combined with rubber and thermoplastic curable sealant form utility components. Metal windows typically suffer from the drawback that they tend to be energy inefficient and tend to transfer substantial quantities of heat from a heated exterior to a cold environment.

Extruded thermoplastic materials have been used in the manufacture of window and door components. Typically, seals, edging, grill and coatings have been manufactured from filled and unfilled thermoplastic materials. Further, thermoplastic polyvinyl chloride materials have been combined with wooden structural members in the manufacturing of PERMASHIELD® brand windows manufactured by Andersen Corporation for many years. The technology for forming the PERMASHIELD® windows is disclosed in Zanini, U.S. Pat. Nos. 2,926,729 and 3,432,883. In the manufacture of the PERMASHIELD®brand windows, a polyvinyl chloride envelope or coating is extruded around the wooden member as it passes through an extrusion dye. Such coated members are commonly used as structural components in forming the window frame or double hung or casement units.

Polyvinyl chloride thermoplastic materials have also been combined with wood products to make extruded materials. Prior efforts have failed to manufacture a material that can be directly extruded to form a structural member that is a direct replacement for wooden members. Such prior art composite members fail to have sufficient modulus (typically about 500,000 or greater), compressive strength, coefficient of thermal expansion, coefficient of elasticity, resistance to insect attack and rot or deterioration, combined with ease of working and fastener retention to be a direct wood replacement material. Further, many prior art extruded composites require post-extrusion milling to obtain a final useful shape. One class of composite, a polyvinyl chloride wood flour material, poses the added problem that wood dust tends to be explosive, as well as the need to size the wood particle, at certain concentrations of wood, dust or flour in the air.

Accordingly, a substantial need exists for the development of a composite material that can be directly formed by extrusion into shapes that are direct substitutes for the equivalent or corresponding shape in a wood structural member. The need requires a modulus (stiffness), an acceptable coefficient of thermal expansion and an easily formable able material that can maintain reproducible stable dimensions, a material having low thermal transmission, improved resistance to insect attack and rot while in use and a material that can be cut, milled, drilled and fastened at least as well as wooden members.

A further need had existed in the art for many years with respect to the byproduct streams produced during the conventional manufacture of wooden windows and doors. Such window and door manufacturers have become significantly sensitive to the production of byproduct streams comprising substantial quantities of wood trim pieces, sawdust, wood milling by-products; recycled thermoplastic including recycled polyvinyl chloride and other byproduct streams. Commonly, these materials are burned for their heat value and electrical power generation or are shipped to qualified landfills for disposable. Such byproduct streams are contaminated with substantial proportions of hot melt and solvent-based adhesives, thermoplastic materials such a polyvinyl chloride, paint preservatives and other organic materials. A substantial need exists to find a productive, environmentally compatible use for such byproduct streams to avoid returning the material into the environment in an environmentally harmful way.

BRIEF DISCUSSION OF THE INVENTION

We have found that superior structural members replacing conventional wooden and clad wooden structural members can comprise a polyvinyl chloride and wood fiber composite material containing a controlled amount of water and optionally an intentionally recycled proportion of window and door manufacture byproduct stream. The structural members of the invention can be used in low strength applications needing a modulus of about 300,000 to 500,000. We have also produced materials that can be used in medium strength applications needing a modulus of about 500,000 to $1 \times 10^6$. Further, we have made materials that can survive the high strength requirements of window and door manufacture that ranges from $1 \times 10^6$ to $2 \times 10^6$ and greater. Such streams can be contaminated with substantial proportions of hot melt adhesive, paints, solvent-based adhesive components, preservatives, polyvinyl chloride recycle, pigment, plasticizers, etc. We have found that the physical properties of the structural materials are not significantly lessened by the presence of such recycle. The structural member composites of this invention can achieve a high modulus, high compressive strength, reproducible dimensions, an acceptable coefficient of elasticity, and thermal expansion. We have found that the successful manufacture and physical properties of the polyvinyl chloride/wood fiber composite requires intimate mixing and intimate contact between the polymeric material and the fiber. During the mixing of the polymer with wood fiber, the product attains control over moisture content, fiber alignment and materials proportions that achieves the manufacture of the superior wood replacement composite.

BRIEF DESCRIPTION OF THE DRAWINGS

FIGS. 1 and 2 are cross-sectional drawings of structural members included in a window (FIG. 1) and a FWHD (FIG. 2).

DETAILED DESCRIPTION OF THE INVENTION

The term "structural member", for the purposes of this application, means a linear member with a regular cross-section or complex cross-section. Linear members can have a circular or oval cross-section and can have a triangular, rectangular, square, pentagonal, hexagonal, octagonal, etc., cross-section. Further, the cross-sectional shape can be adapted to the use of the linear member as a direct replacement for milled wood members in the manufacture of windows and doors. As such, the structural member typically has a length greater than either width or depth. The length can be typically greater than 12 inches and can often be as long as 16 feet. The structural members can come in regular lengths of 3, 4, 5, 6, 8, 10, 12, 16 etc., feet. Regular finished lumber dimensions can be used for manufacture of the structural members, finished 1×1, 1×2, 2×2, 2×4, 2×6, 2×10 members can be achieved.

POLYVINYL CHLORIDE HOMOPOLYMER COPOLYMER AND POLYMER ALLOYS

Polyvinyl chloride is a common commodity thermoplastic polymer. Vinyl chloride monomer is made from a variety of different processes involving the reaction of acetylene and hydrogen chloride and the direct chlorination of ethylene. Polyvinyl chloride is typically manufactured by the free radical polymerization of vinyl chloride resulting. After polymerization, polyvinyl chloride is commonly combined with thermal stabilizers, lubricants, plasticizers, organic and inorganic pigments, fillers, biocides, processing aids, flame retardants or other commonly available additive materials, when needed. Polyvinyl chloride can also be combined with other vinyl monomers in the manufacture of polyvinyl chloride copolymers. Such copolymers can be linear copolymers, can be graft copolymers, random copolymers, regular repeating copolymers, block copolymers, etc. Monomers that can be combined with vinyl chloride to form vinyl chloride copolymers include acrylonitrile; alpha-olefins such as ethylene, propylene, etc.; chlorinated monomers such as vinylidene, dichloride; acrylate momoners such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; or other commonly ,available ethylenically unsaturated monomer compositions. Such monomers can be used in an amount of up to about 50 mol-%, the balance being vinyl chloride.

The primary requirement for the substantially thermoplastic polymeric material comprising vinyl chloride is that it retain sufficient thermoplastic properties to permit melt blending with wood fiber, permit formation of pellets, and to permit the composition material or pellet to be extruded or injection molded in a thermoplastic process forming the rigid structural member. Polyvinyl chloride homopolymers and copolymers are available from a number of manufacturers. Preferred polyvinyl chloride materials are polyvinyl chloride homopolymer having a molecular weight of about 90,000±50,000 most preferably about 85,000±10,000.

WOOD FIBER

Wood fiber, in terms of abundance and suitability can be derived from either soft woods or evergreens or hard woods commonly known as broad leaf deciduous trees. Soft woods are generally preferred for fiber manufacture because the resulting fibers are longer, contain high percentages of lignin and lower percentages of hemicellulose than hard woods. While soft wood is the primary source of fiber for the invention, additional fiber make-up can be derived from a number of secondary sources including natural fibers including bamboo, rice, sugar cane, and recycled or reclaimed fiber from newspapers, boxes, computer printouts, etc.

However, the primary source for wood fiber of this invention comprises the wood fiber by-product of milling soft woods commonly known as sawdust or milling tailings. Such wood fiber has a regular reproducible shape and aspect ratio. The fibers are commonly at least 1 mm in length, 0.3 mm in thickness and commonly have an aspect ratio of at least about 2. Preferably, the fibers are 1 to 7 mm in length, 0.3 to 1.5 mm in thickness with an aspect ratio between 2.5 and 9. The preferred fiber for use in this invention are fibers derived from three processes common in the manufacture of windows and doors. First, wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through a machine which selectively removes wood from the piece leaving the useful shape. Such milling operations produces substantial quantities of shaving sawdust or mill tailing by-products. Lastly, when shaped materials are cut to size and mitered joints, butt joints, overlapping joints, tail joints are manufactured from pre-shaped wooden members, substantial trim is produced. Such large trim pieces are commonly machined to convert the larger objects to wood fiber having dimensions approximating sawdust or mill tailing dimensions. These fiber sources can be mixed to form the fiber input, the streams can be pre-sized to sawdust dimensions or the mixed stream can be sized to desired particle size distributions.

Such sawdust material can contain substantial proportions of by-products including polyvinyl chloride or other polymer materials that have been used as coating, cladding or envelope on wooden members; recycled structural members made from thermoplastic materials; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc., and other streams common in the manufacture of wooden doors and windows. The total byproduct stream content of the wood fiber materials is commonly less than 25 wt-% of the total wood fiber input into the polyvinyl chloride wood fiber product. Of the total recycle, approximately 10 wt-% of that can comprise a vinyl polymer commonly polyvinyl chloride. Commonly, the intentional recycle ranges from about 1 to about 25 wt-%, preferably about 2 to about 20 wt-%, most commonly from about 3 to about 15 wt-%.

MOISTURE CONTROL

Wood fiber, sawdust, has a substantial proportion of water associated with the fiber. Water naturally arises in the incorporation of natural materials in the growth cycle of living wood. Such water remains in the wood even after substantial drying cycles in lumber manufacture. In cured finished lumber used in the manufacture of wooden structural members, the sawdust derived from such operations after equilibration, can contain greater than about 8% water. We have found that control of the water common in wood fibers used in the polyvinyl chloride and wood fiber composite materials and pellet products of the invention is a critical aspect to obtaining consistent high quality surface finish and dimensional stability of the PVC and wood fiber composite structural members. During the manufacture of the pellet material, we have found that the removal of substantial proportion of the water is required to obtain a pellet optimized for further processing into the structural members. Trees when cut depending on relative humidity and season can contain from 30 to 300 wt-% water based on fiber content. After rough cutting and finishing into sized lumber, seasoned wood can have a water content of from 20 to 30 wt-% based on fiber content. Kiln dried sized lumber cut to length can have a water content typically in the range of 8 to 12%, commonly 8 to 10 wt-% based on fiber. Some wood sources, such as poplar or aspen, can have increased moisture content while some hard woods can have reduced water content.

Because of the variation in water content of wood fiber source and the sensitivity of extrudate to water content control of water to a level of less than 8 wt-% in the pellet based on pellet weight is important. Structural members extruded in non-vented extrusion process, the pellet should be as dry as possible and have a water content between 0.01 and 5%, preferably less than 3.5 wt-%. When using vented equipment in manufacturing the extruded linear member, a water content of less than 8 wt-% can be tolerated if processing conditions are such that vented extrusion equipment can dry the thermoplastic material prior to the final formation of the structural member of the extrusion head.

The maximum water content of the polyvinyl chloride/ wood fiber composition or pellet is 4 wt-% or less, preferably 3.0 wt-% or less and most preferably the composition or pellet material contains from about 0.5 to 2.5 wt-% water. Preferably, the water is removed after the material is mixed and formed into an extrusion prior to cutting into pellets. At this stage, water can be removed using the elevated temperature of the material at atmospheric pressure or at reduced pressure to facilitate water removal. The production can be optimized to result in substantial control and uniformity of water in the pellet product.

COMPOSITION AND PELLET MANUFACTURE

In the manufacture of the composition and pellet of the invention, the manufacture and procedure requires two important steps. A first blending step and a second pelletizing step.

During the blending step, the polymer and wood fiber are intimately mixed by high shear mixing components to form a polymer wood composite wherein the polymer mixture comprises a continuous organic phase and the wood fiber with the recycled materials forms a discontinuous phase suspended or dispersed throughout the polymer phase. The manufacture of the dispersed fiber phase within a continuous polymer phase requires substantial mechanical input. Such input can be achieved using a variety of mixing means including preferably extruder mechanisms wherein the materials are mixed under conditions of high shear until the appropriate degree of wetting and intimate contact is achieved. After the materials are fully mixed, the moisture content must be controlled at a moisture removal station. The heated composite is exposed to atmospheric pressure or reduced pressure at elevated temperature for a sufficient period of time to remove moisture resulting in a final moisture content of about 10, preferably 8 wt-% or less. Lastly, the polymer fiber is aligned and extruded into a useful form.

The preferred equipment for mixing and extruding the composition and wood pellet of the invention is an industrial extruder device. Such extruders can be obtained from a variety of manufacturers including Cincinnati Millicron, etc.

The materials feed to the extruder can comprise from about 30 to 50 wt-% of sawdust including recycled impurity along with from about 50 to 70 wt-% of polyvinyl chloride polymer compositions. Preferably, about 35 to 45 wt-% wood fiber or sawdust is combined with polyvinyl chloride homopolymer. The polyvinyl chloride feed is commonly in a small particulate size which can take the form of flake, pellet, powder, etc. Any polymer form can be used such that the polymer can be dry mixed with the sawdust to result in a substantially uniform pre-mix. The wood fiber or sawdust input can be derived from a number of plant locations including the sawdust resulting from rip or cross grain sawing, milling of wood products or the intentional commuting or fiber manufacture from wood scrap. Such materials can be used directly from the operations resulting in the wood fiber by-product or the by-products can be blended to form a blended product. Further, any wood fiber material alone, or in combination with other wood fiber materials, can be blended with by-product from the manufacturer of wood windows as discussed above. The wood fiber or sawdust can be combined with other fibers and recycled in commonly available particulate handling equipment.

Polymer and wood fiber are then dry blended in appropriate proportions prior to introduction into blending equipment. Such blending steps can occur in separate powder handling equipment or the polymer fiber streams can be simultaneously introduced into the mixing station at appropriate feed ratios to ensure appropriate product composition.

In a preferred mode, the wood fiber is placed in a hopper volumetrically controlled to meter the sawdust at a desired volume while the polymer is introduced into a similar hopper have a volumetric metering input system. The volumes are adjusted to ensure that the composite material contains appropriate proportions on a weight basis of polymer and wood fiber. The fibers are introduced into a twin screw extrusion device. The extrusion device has a mixing section, a transport section and a melt section. Each section has a desired heat profile resulting in a useful product. The materials are introduced into the extruder at a rate of about 600 to 1000 pounds of material per hour and are initially heated to a temperature of about 220° C. In the feed section, the stage is maintained at about 215° to 225° C. In the mixing section, the temperature of the twin screw mixing stage is staged beginning at a temperature of about 220° C. leading to a final temperature of about 200° C. at spaced stages increasing in temperature at a rate of about 10° C. per stage. One the material leaves the blending stage, it is introduced into an extruder portion wherein the mixed thermoplastic stream is divided into a number of cylindrical streams through a head section. Such head sections (about 6–8 inches in diameter) can contain from about 10 to 300, preferably 20 to 200 orifices having a cross-sectional shape leading to the production of a regular pellet. As the material is extruded from the head it is cut with a knife at a rotational speed of about 100 to 400 rpm resulting in the desired pellet length.

In similar fashion, the pellet materials of the invention are introduced into an extruder and extruded into the structural members of the invention. The extruder used is a Moldovia 70 extruder with twin parallel screws with an appropriately shaped four zone barrel and one oil heated zone. The equipment directs its product into a 4 foot water tank at a rate of about 4 feet of structural member per minute. A vacuum gauge device can be used to maintain accurate dimensions in the extrudate. The melt temperature of the thermoplastic mass derived from the pellet shall be between 390°–420° F. The melt in the extruder is vented to remove water and the vent is operated at a vacuum of not less than 3 inches of mercury. The extruder barrel has zones of temperature that decrease a maximum of about 240° C. to a minimum of 180°–190° C. in eight successive steps.

DETAILED DISCUSSION OF THE DRAWINGS

Figure 1A:
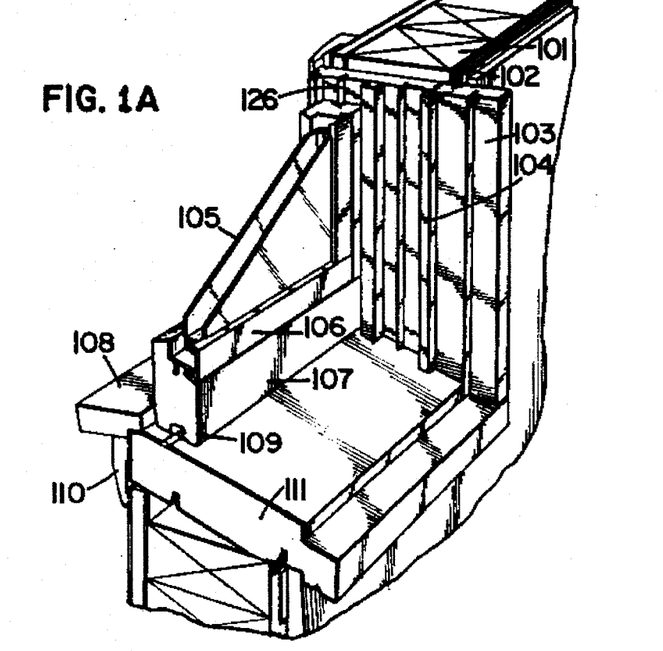
Figure 1B:
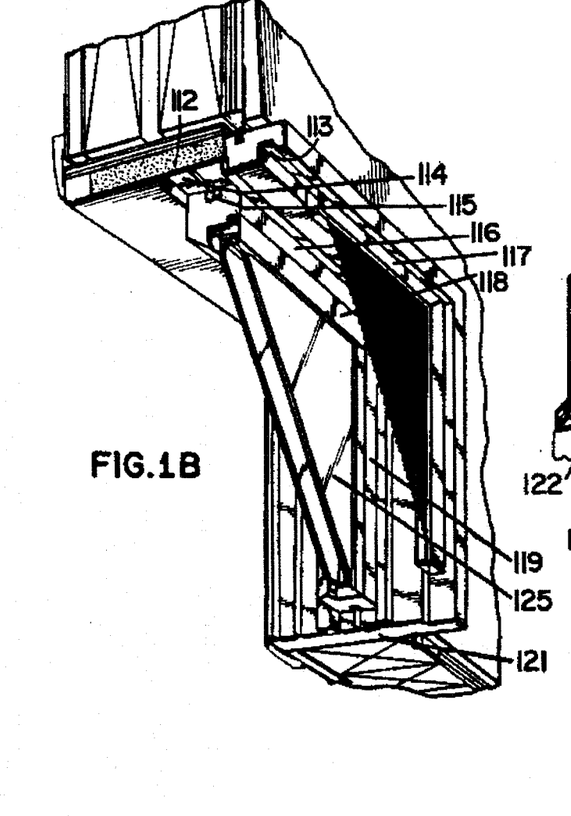
Figure 1C:
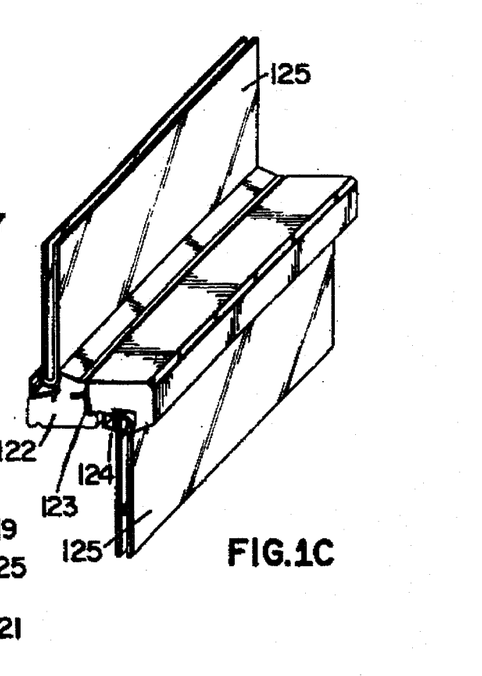

FIG. 1A shows cross-sectional drawings of the structural member components of a window unit of the invention. The window is placed in a wall structure formed from the jack stud 101 which can have an installation flange 102 installed cooperating with the outside frame member 103. The outer frame member 103 can have a side style weather strip 126 that cooperates with the double hung window units fixed within the frame. The outer frame member 103 can have a thermoplastic jamb liner 104 as an outer envelope or cover. The double hung window unit can have high performance insulating glass 105, a vinyl glazing bead 106, a bottom rail sash 107, slidably mounted in the outer frame member 103. The sash bottom rail 107 can rest on a sill member 111 when closed. The exterior of the sill 111 can be trimmed using a stool trim 108 and a sill trim 110. Any of these structural members can be formed by extruding and injection molding the PVC and wood fiber composite of the invention in an appropriate shape. Further, FIG. 1B shows the upper portion of a window unit installed in an opening. The sash top rail 115 is slidably mounted in the head jamb 114 which also contains a screen channel 113 for mounting a screen 117. The sash contains insulating glass 125 that is commonly mounted in a side stile 119. The window also contains a side jamb 121 as the peripheral framing member of the window. In the double hung window unit (FIG. 1C), each sash meets at a joint area wherein the upper rail 122 meets the lower rail 124 with a weather strip 123 sealing the mounted between the rails. The upper and lower insulating glass 125 is shown.

Figure 2A:
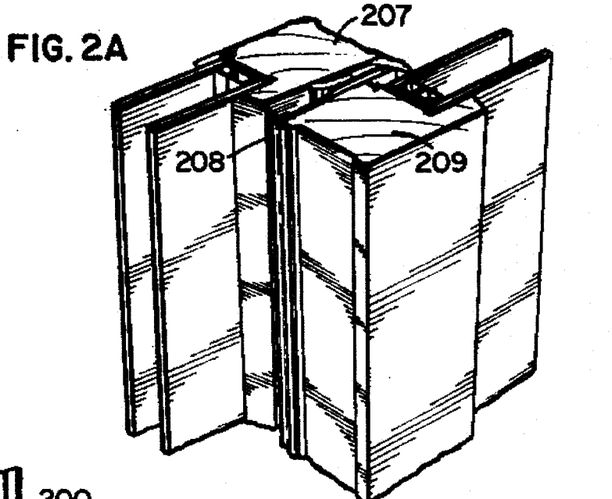
Figure 2B:
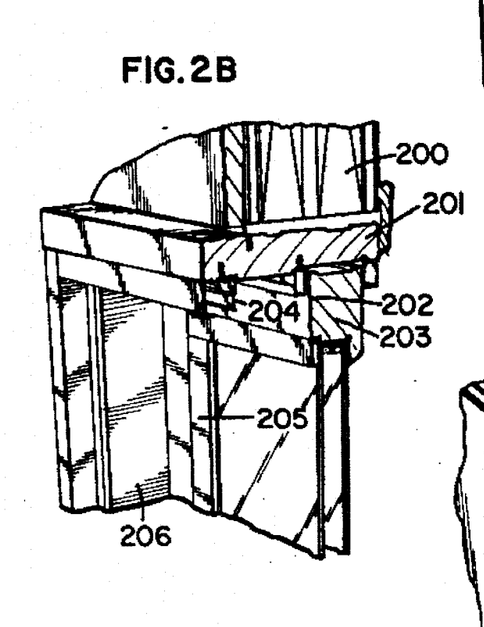
Figure 2C:
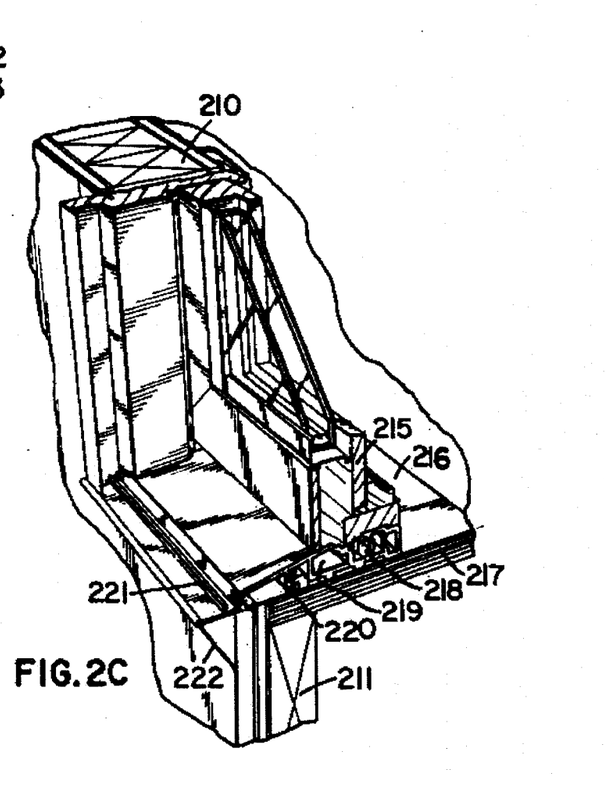

FIG. 2 shows a typical wood sliding door cross-sectional drawing. The top of the door unit (FIG. 2B) is installed into a rough opening frame by the framing member 200. The top of the door is formed by the head jamb 201 which is mated with the top rail 203 which is fixed in place by the head stop and weather strip 202. The head jamb can also include a screen channel 204. The window also includes a side stile 205 and a side jamb 206. The center joint (FIG. 2A) of the sliding glass door is formed as shown where the stationary stile 207 meets the operating stile 209 sealed by a weather strip 208. The window base (FIG. 2C) is framed by framing members 210 and 211. The door frame comprises an extruded aluminum screen track 221 covering an extruded composite sill 219. The bottom of the door is sealed with a weather strip 218. The window base rests on a subfloor 217 which is sealed by a finished floor 216. The bottom of the operating door 215 rests upon the composite member 219. Any of the structural members of the windows shown in the Figures can be made of the extruded thermoplastic polymer wood fiber composite of the invention.

EXPERIMENTAL

The following examples and data were developed to further illustrate the invention that is explained in detail above. The following information illustrates the typical production conditions and compositions and the tensile modulus of a structural member made from the pellet. The following examples and data shown in Table 1 contain a best mode.

EXAMPLE 1

A Cincinnati millicron extruder with an HP barrel, Cincinnati pelletizer screws, an AEGK-20 pelletizing head with 260 holes, each hole having a diameter of about 0.0200 inches was used to make the pellet. The input to the pelletizer comprised approximately 60 wt-% polymer and 40 wt-% sawdust. The polymer material comprise a thermoplastic mixture of approximately 100 parts of polyvinyl chloride homopolymer, about 15 parts titanium dioxide, about 2 parts ethylene bis-stearamide wax lubricant, about 1.5 parts calcium stearate, about 7.5 Rohm & Haas 820-T acrylic resin impact modifier/process aid and about 2 parts of dimethyl tin thioglycolate. The sawdust comprises a wood fiber particle containing about 5 wt-% recycled polyvinyl chloride having a composition substantially identical to that recited above. The initial melt temperature in the extruder was maintained between 350° C. and 400° C. The pelletizer was operated at a vinyl sawdust combined through put of 800 pounds per hour. In the initial extruder feed zone, the barrel temperature was maintained between 215°–225° C. In the intake zone, the barrel was maintained at 215°–225° C., in the compression zone the temperature was maintained at between 205°–215° C. and in the melt zone the temperature was maintained at 195°–205° C. The die was divided into three zones, the first zone at 185°–195° C., the second die zone at 185°–195° C. and in the final die zone at 195°–205° C. The pelletizing head was operated at a setting providing 100 to 400 rpm resulting in a pellet with a diameter of 5 mm and a length as shown in the following Table.

TABLE I

PELLETIZER RESULTS

| Pelletizer | Pellet | Profile | Sawdust | Pellet | Pellet Bulk | Profile | Tensile |

| PVC/Wood Fiber | Melt TEMP, F. | Length in. | Melt Temp, F. | Profile Visc. | Moisture % | Moisture % | Density g/cc | Density g/cc | Modulus psi |
|---|---|---|---|---|---|---|---|---|---|
| 60/40 | | 0.233 | 366 | 2580 | 4.71, 4.83 | 0.96 | .546 (.006) | 1.426 | 990600 |
| | | | 365 | 2755 | | | | | |
| 60/40 | | 0.233 | 362 | 2452 | 4.71, 4.83 | 0.96 | .546 (.006) | | |
| 70/30 | 375 | 0.080 | 375 | 2274 | 5.28 | 1.54 | .434 (.007) | 1.43 | 733300 |
| 70/30 | 375 | 0.080 | 376 | 2299 | 5.28 | 1.54 | .454 (.007) | 1.435 | 820100 |
| 50/50 | 372 | 0.084 | 382 | 2327 | 4.94 | 1.95 | .347 (.002) | 1.367 | 697600 |
| 70/30 | 374 | 0.195 | 385 | 2431 | | 0.93 | .595 (.005) | 1.427 | 732900 |
| 70/30 | 374 | 0.195 | 378 | 2559 | | 0.93 | .595 (.005) | 1.433 | 787600 |
| 60/40 | 375 | 0.089 | 377 | 1985 | 5.36 | 1.33 | .418 (.003) | 1.423 | 1103000 |
| 60/40 | 375 | 0.089 | 374 | 2699 | 5.36 | 1.33 | .418 (.003) | 1.408 | 815800 |
| 50/50 | 374 | 0.201 | 367 | 2541 | 5.33 | 2.09 | .462 (.004) | | |
| 50/50 | 364 | 0.201 | 366 | 2670 | 5.33 | 2.09 | .462 (.004) | 1.397 | 724300 |
| 60/40 | 351 | 0.247 | 374 | 1948 | 4.62 | 1.03 | .466 (.009) | 1.426 | 860000 |
| 60/40 | 351 | 0.247 | 370 | 2326 | 4.62 | 1.03 | .466 (.009) | 1.433 | 996700 |
| 60/40 | 361 | 0.103 | 373 | 1605 | 5.53 | 1.57 | .387 (.005) | 1.431 | 985400 |
| 60/40 | 361 | 0.103 | 381 | 2221 | 5.53 | 1.57 | .387 (.005) | 1.435 | 855800 |
| 70/30 | 364 | 0.202 | 376 | 1837 | 5.25 | 1.50 | .429 (.010) | 1.433 | 868300 |
| 70/30 | 364 | 0.202 | 378 | 2376 | 5.25 | 1.50 | .429 (.010) | 1.434 | 798100 |
| 70/30 | 367 | 0.085 | 374 | 1593 | | 1.48 | .378 (.002) | 1.438 | 744200 |
| 70/30 | 367 | 0.085 | 375 | 2145 | | 1.48 | .378 (.002) | 1.439 | 765000 |
| 50/50 | 367 | 0.177 | 371 | 2393 | 5.08, 5.51 | 1.61 | .434 (.007) | 1.408 | 889200 |
| 50/50 | 367 | 0.177 | 371 | 3008 | 5.08, 5.51 | 1.61 | .434 (.007) | 1.528 | 1029000 |
| 50/50 | 366 | 0.085 | 370 | 2666 | | 2.01 | .438 (.003) | 1.405 | 922100 |
| 50/50 | 366 | 0.085 | 369 | 2257 | | 2.01 | .438 (.003) | 1.383 | 922600 |

In the Table, the composite material is made from a polyvinyl chloride known as GEON 427 obtained from B. F. Goodrich Company. The polymer is a polyvinyl chloride homopolymer containing about 88,000±2,000. The wood fiber is sawdust by-product of milling soft woods in the manufacture of wood windows at Andersen Corporation, Bayport, Minn. The wood fiber input contained 5% intentional PVC impurity recycle. The modulus for the polyvinyl chloride compound measured similarly to the composite materials is about 430,000. The Youngs modulus is measured using an Instron Model 450S Series 9 software automated materials testing system and uses an ASTM method D-638. Specimens are made according to the test and are measured at 50% relative humidity, 73° F. with a cross head speed of 0.200 in./min.

After Table, we have found that the preferred pellet of the invention displays a Youngs modulus of at least 500,000 and commonly falls in the range greater than about 800,000, preferably between 800,000 and $2.0 \times 10^6$. Further, the coefficient of thermal expansion of the material is well matched to a compromising between aluminum, PVC and wood products and ranges from about 1.6 to $1.8 \times 10^{-5}$ inches per - fahrenheit degree. We believe that the superior properties of the structural members made from the composite or pellet of the invention are in large part due to the nature of the pellet set forth in the Table above. We believe the Table clearly shows that the polyvinyl chloride and wood fiber can be combined at various proportions under a variety of temperature conditions to produce a regular pellet. The pellet then can be used in further extrusion processes to form a useful extruded structural member useful in the manufacture of environmentally sensitive windows and doors. The composite is a superior replacement for wood because it has similar mechanical properties but attains a dimensional stability and resistance to rot, and insect damage not attainable by wood products.

TABLE II

| | | | | | | | |
|---|---|---|---|---|---|---|---|
| | | | COMPOSITE SHRINKAGE RESULTS | | | | |
| PVC/Wood Fiber (wt-%) 0 | Pelletizer Melt Temp, °F. | Pellet Length in. mm | Profile Melt Temp, F. | Profile Melt Pressure (psi) | Member Tensile Modulus (psi) | 190° F. Water Bath Shrinkage | 180° F. Oven Shrinkage |
| 60/40 | | .233 | 366.5 | 2580 | 990600 | 0.17% | 0.16% |
| | | | 365.8 | 2755 | | | |
| 60/40 | | .233 | 362.5 | 2452 | | | |
| 70/30 | 375.7 (1.5) | .080 | 373.5 | 2274 | 733300 | 0.18% | 0.34% |
| 70/30 | 375.7 (1.5) | .080 | 376.8 | 2299 | 820100 | 0.14% | 0.32% |
| 50/50 | 372.5 (1.9) | .084 | 382.8 | 2327 | 697600 | 0.00% | 0.29% |
| 70/30 | 374.8 (1.5) | .195 | 385 | 2431 | 762900 | 0.06% | 0.31% |
| 70/30 | 374.8 (1.5) | .195 | 378.9 | 2559 | 787600 | 0.00% | 0.27% |
| 60/40 | 375.9 (1.1) | .089 | 377.1 | 1985 | 1103000 | 0.00% | 0.22% |
| 60/40 | 373.9 (1.1) | .089 | 374.6 | 2899 | 815800 | 0.20% | 0.051 |
| 50/50 | 374.2 (.9) | .201 | 367.6 | 2541 | | | |
| 50/50 | 364.2 (.9) | .201 | 366.4 | 2670 | 724300 | | |
| 60/40 | 331.8 (4.9) | .247 | 374.7 | 1948 | 860000 | 0.00% | 0.25% |
| 60/40 | 351.8 (4.9) | .247 | 370.5 | 2326 | 998700 | 0.04% | 0.20% |
| 60/40 | 361.2 (1.3) | .103 | 373.4 | 1605 | 985400 | 0.00% | 0.23% |
| 60/40 | 361.2 (1.3) | .103 | 381.5 | 2221 | 855800 | 0.07% | 0.21% |

TABLE II-continued

COMPOSITE SHRINKAGE RESULTS

| PVC/Wood Fiber (wt-%) 0 | Pelletizer Melt Temp, °F. | Pellet Length in. mm | Profile Melt Temp, F. | Profile Melt Pressure (psi) | Member Tensile Modulus (psi) | 190° F. Water Bath Shrinkage | 180° F. Oven Shrinkage |
|---|---|---|---|---|---|---|---|
| 70/30 | 365.8 (1.6) | .202 | 376.5 | 1837 | 868300 | 0.05% | 0.26% |
| 70/30 | 364.8 (1.6) | .202 | 378.1 | 2376 | 788100 | 0.17% | 0.22% |
| 70/30 | 367.5 (1.1) | .085 | 374.9 | 1593 | 744200 | 0.20% | 0.34% |
| 70/30 | 367.3 (1.1) | .085 | 375.2 | 2145 | 765000 | | |
| 50/50 | 367.4 (1.7) | .177 | 371.9 | 2393 | 899200 | | |
| 50/50 | 367.4 (1.7) | .177 | 371.2 | 3008 | 1029000 | 0.00% | 0.21% |
| 50/50 | 366.4 (2.6) | .085 | 370.7 | 2666 | 922100 | 0.05% | 0.23% |
| 50/50 | 366.4 (2.6) | .085 | 369.6 | 2257 | 922600 | 0.09% | 0.24% |
| 100* | | | | | 429300 | 0.95% | 0.85% |

*PVC

The data in Table II shows the production of a composite structural member from a composite pellet. The member has excellent tensile modulus and high temperature shrinkage properties.

Pellets of the invention were formed into standard test units using a standard injection molding apparatus. The results are shown in the following Table. The test production run and conditions follow.

TABLE III

Injection Molded Samples

| Description | Tensile Modulus psi | Standard Deviation psi |
|---|---|---|
| High Melt/ Large Pellet/40% | 1,205,000 | 242,400 |
| PVC | 488,800 | 28,370 |
| High Melt/ Small Pellet/40% | 1,232,000 | 133,300 |

These data also demonstrates the injection moldability of composite materials.

| Pellet | Small 1 Lg. Pellet 40% | Large 1 Lg. Pellet 40% | Small 2 PVC | Large 2 PVC | Small 3 Sm. Pellet 40% | Large 3 Sm. Pellet 40% |
|---|---|---|---|---|---|---|
| STD. CYCLE: | 30.0 | 30.0 | 30.0 sec. | 30.0 sec. | 30.0 sec. | 30.0 sec. |
| Inj. Fast Time | — | — | — | — | — | — |
| Inj. Boost Time | 2.5 | 3.0 | 2.5 | 3.0 | 3.0 | 3.0 |
| Fill Time | 1.0 to 1.2 | 1.2 to 1.5 | 1.2 | 1.6 | 1.2 | 1.6 |
| Inj. Mold Time | 12.0 | 12.0 | 12.0 | 12.0 | 12.0 | 12.0 |
| Mold Closed Time | 25.0 | 25.0 | 25.0 | 25.0 | 25.0 | 25.0 |
| Mold Open Time | 0.5 | 0.5 | 0.5 | 0.5 | 0.5 | 0.5 |
| Inj. Fast Pressure | — | — | — | — | — | — |
| Inj. Boost Pressures | 1800 psi | 1850 psi | 1300 psi | 1350 psi | 1600 psi | 1700 psi |
| Inj. Mold Pressure | 800 psi | 800 psi | 1000 psi | 1000 psi | 1000 psi | 1000 psi |
| Back Pressure | 30 lbs. | 30 lbs. | 30 lbs. | 30 lbs. | 30 lbs. | 30 lbs. |
| Inj. Speed | w/o Fast | w/o Fast | w/o Fast | w/o Fast | w/o Fast | w/o Fast |
| Screw Speed | Slow | Slow | Slow | Slow | Slow | Slow |
| Feed | 1½" | 2" | 1½" | 2" | 1½" | 2" |
| Cushion | ½" | ½" | ½" | ½" | ½" | ½" |
| Decompress | Off | Off | Off | Off | Off | Off |
| Front Zone | 340° F. | 340° F. | 340° F. | 340° F. | 340° F. | 340° F. |
| Rear Zone | 330 | 330 | 330 | 330 | 330 | 330 |
| Melt Temp. | 360 to 370 | 360 to 370 | 360 to 370 | 360 to 370 | 360 to 370 | 360 to 370 |
| Nozzle Radius | ½" | | | | | |
| Nozzle Orifice | Same as Mold | | | | | |
| Core Seq. | None | — | — | — | — | — |
| E. J. Stroke | Max. | — | — | — | — | — |
| K. O. Bar Length | The Backs Std. | — | — | — | — | — |
| K.O. Stud Length | ⅝" | — | — | — | — | — |
| Mold Open Stroke | 16" | — | — | — | — | — |
| Multi Stroke | 2 | — | — | — | — | — |

-continued

|  | Small 1 Lg. Pellet | Large 1 Lg. Pellet | Small 2 | Large 2 | Small 3 Sm. Pellet | Large 3 Sm. Pellet |
| --- | --- | --- | --- | --- | --- | --- |
| Pellet | 40% | 40% | PVC | PVC | 40% | 40% |
| Die Slow | To Fast–Med. | — | — | — | — | — |
| A-Side Water | Tower | Tower | Tower | Tower | Tower | Tower Tower Water |
| B-Side Water Pot Settings | Tower | Tower | Tower | Tower | Tower | Tower Average 76° |
| Full Open | Auto | Auto | Auto | Auto | Auto | Auto |

The materials of the invention were further tested for fungal stability. The results are shown in Table IV.

TABLE IV

ASTM D-1413 (Fungal Resistance Test) Results

PVC Composite:

| Use | PVC Wt.-% | Fungi | Wt. After Leaching (g) | Final Wt. (g) | Wt. Loss (g) | Wt. Loss (%) |
| --- | --- | --- | --- | --- | --- | --- |
| Soil Block* |  | GT | 8.56 | 8.56 | 0.00 | 0.00% |
| Soil Block |  | GT | 8.64 | 8.64 | 0.00 | 0.00% |
| Soil Block |  | GT | 8.47 | 8.45 | 0.02 | 0.24% |
| Soil Block |  | GT | 8.58 | 8.58 | 0.00 | 0.00% |
| Soil Block |  | GT | 8.57 | 8.57 | 0.00 | 0.00% |
|  |  |  | (Average = 0.05% S.D. = 0.11%) | | | |
| Soil Block |  | TV | 9.23 | 9.23 | 0.00 | 0.00% |
| Soil Block |  | TV | 8.51 | 8.48 | 0.03 | 0.35% |
| Soil Block |  | TV | 8.93 | 8.93 | 0.00 | 0.00% |
| Soil Block |  | TV | 8.94 | 8.94 | 0.00 | 0.00% |
| Soil Block |  | TV | 8.35 | 8.35 | 0.00 | 0.00% |
|  |  |  | (Average = 0.07% S.D. = 0.16%) | | | |

Untreated Ponderosa Pine Controls:

| Use | Fungi | Initial Wt. (g) | Final Wt. (g) | Wt. Loss (g) | Wt. Loss (%) |
| --- | --- | --- | --- | --- | --- |
| Soil Block | GT | 3.07 | 1.41 | 1.66 | 54.07% |
| Soil Block | GT | 3.28 | 1.59 | 1.69 | 51.52% |
| Soil Block | GT | 3.42 | 1.65 | 1.77 | 51.75% |
| Soil Block | GT | 3.04 | 1.29 | 1.75 | 57.57% |
| Soil Block | GT | 3.16 | 1.71 | 1.45 | 45.89% |
|  |  | (Average = 52.16% S.D. = 4.27%) | | | |
| Soil Block | TV | 3.15 | 2.88 | 0.27 | 8.57% |
| Soil Block | TV | 3.11 | 2.37 | 0.74 | 23.79% |
| Soil Block | TV | 3.02 | 2.73 | 0.29 | 9.60% |
| Soil Block | TV | 3.16 | 2.17 | 0.45 | 14.24% |
| Soil Block | TV | 3.06 | 2.41 | 0.65 | 21.241 |
|  |  | (Average = 15.49%; S.D. = 6.82%) | | | |

Treated Ponderosa Pine Controls:

| Use | PVC Wt.-% | Fungi | Wt. After Leaching (g) | Final Wt. (g) | Wt. Loss (g) | Wt. Loss (%) |
| --- | --- | --- | --- | --- | --- | --- |
| Soil Block |  | GT | 3.53 | 3.49 | 0.04 | 1.13% |
| Soil Block |  | GT | 3.37 | 3.35 | 0.02 | 0.59% |
| Soil Block |  | GT | 3.60 | 3.59 | 0.01 | 0.28% |
| Soil Block |  | GT | 3.28 | 3.25 | 0.03 | 0.91% |
| Soil Block |  | GT | 3.41 | 3.38 | 0.03 | 0.88% |
|  |  |  | (Average = 0.76% S.D. = 0.33%) | | | |
| Soil Block |  | TV | 3.41 | 3.40 | 0.01 | 0.29% |
| Soil Block |  | TV | 3.80 | 3.78 | 0.02 | 0.53% |
| Soil Block |  | TV | 3.37 | 3.35 | 0.02 | 0.59% |

TABLE IV-continued

ASTM D-1413 (Fungal Resistance Test) Results

| Soil Block |  | TV | 3.39 | 3.36 | 0.03 | 0.88% |
| --- | --- | --- | --- | --- | --- | --- |
| Soil Block |  | TV | 3.35 | 3.33 | 0.02 | 0.60% |
|  |  |  | (Average = 0.58% S.D. = 0.21%) | | | |

GT = *Gloeophyllum Trabeum* (brown-rot fungus)
TV = *Trametes versicolor* (white-rot fungus)
*A cube as defined in ASTM D-1413

The composite materials were superior to the pine samples.

Tensile modulus is defined as the steepest linear region of the stress/strain curve (based on original sample dimensions) curve between the origin and material yield (Instron series IX calculation 19.3). Tensile yield is the first stress level at which the stress/strain curve attains a zero slope (calculation 8.4). Toughness is the integrated area under the load/displacement curve divided by the volume of the sample gauge length (calculation 43.5).

PRODUCTS TESTED
1) Secondary PVC 0.1" thick extruded strip
2) 60/40 Nonpelletized 0.1" thick extruded strip
3) 60/40 Pelletized 0.1" thick extruded strip
4) 60/40 Pelletized with Additive 0.1" thick extruded strip
5) Treated Ponderosa Pine Purpose:
 To determine the water absorption characteristics of the above specimens.

Conclusion
 Secondary PVC showed the lowest and most consistent results in change in weight over twenty-two hours. Ponderosa Pine demonstrated the highest change and variability in weight change over twenty-two hours. All three of the 60/40 blends performed similarly absorbing less than 1/10 as much water as treated pine.

The Secondary PVC, however, in volume change over twenty-two hours, had the highest change. Again, the three 60/40 blends were approximately the equal. Ponderosa pine performed about 4 times worse than the blends (see data below).

| Product | Average % Weight Change After 22 Hrs. | Average % Weight Change After 22 Hrs. |
| --- | --- | --- |
| 1 | .45 (.34) | 20 (4.0) |
| 2 | 5.4 (.88) | 3.4 (3.7) |
| 3 | 4.3 (.95) | 3.7 (3.0) |
| 4 | 3.5 (.56) | 3.6 (2.7) |
| Ponderosa Pine | 71 (22) | 12 (6.9) |

Method of Testing
 Ponderosa pine samples were made by cutting 0.100" thick strips from the inside stop portion of head/sill profiles.

Wood moisture content at the time of water soak testing was determined to be 14% using the oven dry procedure of ASTM D-143.

Water absorption samples were made by cutting disks with a diameter of approximately 1.080 in from the pine and extruded samples. More samples (15) were prepared from the Ponderosa Pine because of its obvious variability in water absorption characteristics. This allowed for a better chance of more consistent data readings. Only six samples were prepared from of the other materials.

Testing procedures and calculations followed ASTM D1037 specifications.

TABLE V $H_2O$ Adsorption and Thickness Swelling

| Samples | Initial | 22 Hrs. | Weight Change | % Weight Change | Initial | 22 Hrs. | Volume Change | % Volume Change |
|---|---|---|---|---|---|---|---|---|
| SECONDARY PVC | | | | | | | | |
| 1 | 2.2572 | 2.2703 | 0.0131 | 0.58 | 0.125 | 0.098 | 0.027 | 21.5 |
| 2 | 2.206 | 2.2163 | 0.0103 | 0.47 | 0.128 | 0.105 | 0.023 | 18 |
| 3 | 2.2064 | 2.208 | 0.0016 | 0.07 | 0.123 | 0.091 | 0.032 | 26 |
| 4 | 2.1879 | 2.1895 | 0.0016 | 0.07 | 0.088 | 0.106 | 0.018 | 20.5 |
| 5 | 2.3189 | 2.3412 | 0.0223 | 0.96 | 0.094 | 0.111 | 0.017 | 18.1 |
| 6 | 2.2525 | 2.2646 | 0.0121 | 0.54 | 0.106 | 0.12 | 0.014 | 13.2 |
| | | | Avg. 0.45(.34) | | | | Avg. 20(04) | |
| 60/40 NON-PELLETIZED | | | | | | | | |
| 1 | 1.5637 | 1.6444 | 0.0807 | 5.2 | 0.072 | 0.074 | 0.002 | 2.8 |
| 2 | 1.5033 | 1.5868 | 0.0835 | 5.6 | 0.076 | 0.077 | 0.001 | 1.3 |
| 3 | 1.5984 | 1.6694 | 0.071 | 4.4 | 0.078 | 0.08 | 0.002 | 2.6 |
| 4 | 1.5191 | 1.5872 | 0.0681 | 4.5 | 0.074 | 0.073 | 0.001 | 1.4 |
| 5 | 1.4515 | 1.5462 | 0.0947 | 6.5 | 0.074 | 0.075 | 0.001 | 1.4 |
| 6 | 1.5099 | 1.5948 | 0.0939 | 6.3 | 0.074 | 0.082 | 0.008 | 10.8 |
| | | | Avg. 5.4(.88) | | | | Avg. 3.4(3.7) | |
| 60/40 PELLETIZED | | | | | | | | |
| 1 | 1.6321 | 1.7074 | 0.0753 | 4.6 | 0.084 | 0.077 | 0.007 | 8.3 |
| 2 | 1.6262 | 1.7006 | 0.0804 | 4.9 | 0.078 | 0.083 | 0.005 | 6.4 |
| 3 | 1.5855 | 1.6735 | 0.088 | 5.6 | 0.076 | 0.075 | 0.001 | 1.3 |
| 4 | 1.6814 | 1.7311 | 0.0497 | 3 | 0.083 | 0.082 | 0.001 | 1.2 |
| 5 | 1.6851 | 1.7486 | 0.0635 | 3.8 | 0.084 | 0.082 | 0.002 | 2.4 |
| 6 | 1.6682 | 1.7284 | 0.0602 | 3.6 | 0.079 | 0.081 | 0.002 | 2.5 |
| | | | Avg. 4.3(.95) | | | | Avg. 3.7(3.0) | |
| PONDEROSA PINE | | | | | | | | |
| 1 | 0.6747 | 1.0531 | 0.3784 | 56 | 0.107 | 0.084 | 0.023 | 21 |
| 2 | 0.673 | 1.0401 | 0.3671 | 55 | 0.069 | 0.082 | 0.013 | 19 |
| 3 | 0.6659 | 1.0322 | 0.3763 | 57 | 0.075 | 0.078 | 0.003 | 46 |
| 4 | 0.4836 | 0.8846 | 0.401 | 83 | 0.077 | 0.079 | 0.002 | 2.6 |
| 5 | 0.4654 | 0.8527 | 0.3963 | 85 | 0.073 | 0.074 | 0.007 | 9.6 |
| 6 | 0.6504 | 1.0438 | 0.3934 | 60 | 0.071 | 0.083 | 0.012 | 16.9 |
| 7 | | | | | | 0.081 | 0.004 | |
| 8 | 0.749 | 1.244 | 0.4954 | 66 | 0.081 | 0.088 | 0.007 | 5.2 |
| 9 | 0.4763 | 1.0667 | 0.5904 | 24 | 0.072 | 0.08 | 0.009 | 12.5 |
| 10 | 0.4817 | 0.8357 | 0.374 | 81 | 0.071 | 0.074 | 0.003 | 4.2 |
| 11 | 0.6574 | 0.8795 | 0.2221 | 34 | 0.076 | 0.089 | 0.013 | 17.1 |
| 12 | 0.4685 | 0.8981 | 0.4296 | 92 | 0.071 | 0.082 | 0.011 | 15.5 |
| 13 | 0.8917 | 1.1006 | 0.4089 | 59 | 0.07 | 0.08 | 0.01 | 14.3 |
| 14 | 0.6605 | 1.0323 | 0.3718 | 56 | 0.101 | 0.08 | 0.021 | 20.8 |
| 15 | 0.4817 | 0.8695 | 0.3879 | 81 | 0.073 | 0.075 | 0.002 | 2.7 |
| | | | Avg. 71(22) | | | | Avg. 12(6.9) | |

We claim:

1. A wood-thermoplastic polymer composite structural member, suitable for use as a replacement for a wood structural member, which thermoplastic composite structural member comprises an extrudate having a Youngs modulus of greater than 500,000, and a coefficient of thermal expansion less than $3 \times 10^{-5}$ in/in-° F. and which composite member comprises a continuous organic phase comprising polyvinyl chloride and, dispersed in the continuous phase, 30–50 wt-% of a wood fiber having an aspect ratio of at least about 2 to provide structural properties to the composite.

2. The composite structural member of claim 1 wherein the polymer is a homopolymer and the composite has a coefficient of thermal expansion is about $1.5 \times 10^{-5}$ to $2.5 \times 10^{-5}$ in/in-° F.

3. The composite structural member of claim 1 having a rectangular cross-section with a width greater than about 1 cm and a depth greater than about 1 cm.

4. The composite member of claim 1 having a square cross-section with a width greater than about 1 cm.

5. The composite member of claim 1 having a length greater than about 30 cm.

6. The composite member of claim 1 having a shaped member cross-section.

7. The composite member of claim 6 which comprises a jamb.

8. The composite member of claim 6 which comprises a stop.

9. The composite member of claim 6 which comprises a rail.

10. The composite member of claim 6 which comprises a casing.

11. The composite member of claim 6 which comprises a sill.

12. The composite member of claim 6 which comprises a stile.

13. The composite member of claim 6 which comprises a grill component.

14. The composite member of claim 6 which comprises a track.

15. The composite member of claim 14 wherein the track comprises a window sash track.

16. The composite member of claim 14 wherein the track comprises a door tack.

* * * * *

UNITED STATES PATENT AND TRADEMARK OFFICE
CERTIFICATE OF CORRECTION

PATENT NO. : 5,539,027
DATED : July 23, 1996
INVENTOR(S) : Deaner et al.

It is certified that error appears in the above-identified patent and that said Letters Patent is hereby corrected as shown below:

<u>Title page,</u>
Item [63], Related U.S. Application Data: "Continuation of Ser. No. 224,399, Apr. 7, 1994, abandoned" should read -- Continuation of Ser. No. 224,399, Apr. 7, 1994, U.S. Patent No. 5,486,553 --

Signed and Sealed this

Twenty-fourth Day of December, 2002

JAMES E. ROGAN
*Director of the United States Patent and Trademark Office*